United States Patent
Harada et al.

[19]

[11] Patent Number: 5,806,642
[45] Date of Patent: Sep. 15, 1998

[54] CONTROL SYSTEM FOR AUTOMATIC TRANSMISSION

[75] Inventors: Shingo Harada; Yuji Shitani; Tetsuya Kyakuno; Tetsuro Takaba; Hidetoshi Nobumoto, all of Hiroshima, Japan

[73] Assignee: Mazda Motor Corporation, Hiroshima, Japan

[21] Appl. No.: 685,836

[22] Filed: Jul. 24, 1996

[30] Foreign Application Priority Data

Jul. 25, 1995 [JP] Japan ................................. 7-209926

[51] Int. Cl.⁶ ................................................. F16H 61/00
[52] U.S. Cl. ................................... 192/4 A; 477/901
[58] Field of Search ........................ 192/4 A; 477/901

[56] References Cited

U.S. PATENT DOCUMENTS

3,881,368  5/1975  Furuhashi et al. ................ 477/901
5,544,053  8/1996  Nakashima ........................ 477/901

*Primary Examiner*—Dirk Wright
*Attorney, Agent, or Firm*—Sixbey, Friedman, Leedom & Ferguson, PC; Gerald J. Ferguson, Jr.; Donald R. Studebaker

[57] ABSTRACT

An automatic transmission control system causes a downshift to a gear which can provide an effect of engine braking greater than that provided before the downshift when the vehicle falls its speed with a specified rate of speed reduction as a result of footbrake application while the vehicle is traveling on a downgrade having a slope greater than a specified slope.

26 Claims, 7 Drawing Sheets

FIG. 7

CONTROL SYSTEM FOR AUTOMATIC TRANSMISSION

BACKGROUND OF THE INVENTION

1. Field of the Invention

The invention relates to a control system for an automotive automatic transmission, and more particular, to an automotive automatic transmission control system capable of providing a more pronounced engine braking effect by means of shifting down the automatic transmission during driving on a downgrade.

2. Description of Related Art

Automotive automatic transmission control systems conventionally apply a map of prearranged gear shifts in relation to vehicle speed and throttle opening as shifting parameters on the basis of which suitable gears are selectively changed.

In cases where the vehicle enters a downgrade from a flat road while driving in fourth gear in drive (D) range, such an automatic transmission must be put into third gear or a gear lower than third gear to apply engine braking more effectively. Because the gear shift map is set up for flat road conditions and does not always provide appropriate downshifts until the vehicle attains considerably low speeds, it does not suit practical driving situations. For this reason, there have been utilized downgrade dive control systems to execute downshifts to suitable lower gears when the vehicle is on downgrades at specific gradients. While this type of downgrade drive control system is able to shift down the automatic transmission in response to driving on downgrades, timing of the downshift or driving situations in which the vehicle encounters downshifts still remain an important factor in view of a driving feeling or sensation experienced by the driver. If decision standards of driving conditions are not suited, unpleasant sensations are experienced by the driver due to unsatisfactorily timed downshifts.

There has been proposed in, for instance, Japanese Unexamined Patent Publication No. 5 - 231518 a downgrade gear shift control system in which a downshift is caused when a rate of vehicle speed reduction resulting from application of footbrake exceeds a specified reference rate which is altered according slopes of downgrades. In other words, because the fact that the rate of vehicle speed reduction has become greater than the specified rate as a result of footbrake application signifies that the driver evidently intends to decelerate the vehicle, in such an event, a downshift is needed and executed accordingly. This prior art downgrade gear shift control system uses the reference rate of vehicle speed reduction which decreasingly alters as the downgrade becomes steeply, thus resulting in relatively easy or fast downshifts in cases where the vehicle is traveling on a steep downgrade and effecting engine braking earlier.

Because the prior art downgrade gear shift control system causes a downshift of the automatic transmission at the same timing regardless of vehicle speeds if the same rate of vehicle speed reduction is encountered, when a downshift to third gear is caused at for example, a vehicle speed of 80 Km/h or a vehicle speed of 50 Km/h, torque fluctuations are greater for 80 Km/h than for 50 Km/h. Accordingly, a problem is encountered in that a downshift executed at higher vehicle speeds generates significantly more shift shock than one executed at lower vehicle speeds.

SUMMARY OF THE INVENTION

An object of the invention is to provide an automatic transmission control system which incorporates a downgrade gear shift control capable of making reference to vehicle speed when the automatic transmission is shifted down while the vehicle is on a downgrade with the purpose of providing an greater engine braking effect.

The automatic transmission control system of the invention capable of downshifting the automatic transmission in order to attain a pronounced engine braking effect while the vehicle is on a downgrade, when, as a result of footbrake application, a vehicle speed reduction exceeds a specific reference value of vehicle speed reduction and incorporates a vehicle speed monitor means and a shift control means to alter the reference value of vehicle speed reduction in relation to vehicle speed monitored by the vehicle speed monitoring means. Because the reference vehicle speed reduction is altered in relation to vehicle speed as a control factor, the problem of excessively harsh shift shocks during downshifts at high vehicle speeds is eliminated.

The automatic transmission control system additionally incorporates a slope of a downgrade on which the vehicle is traveling in the alteration of the reference value of vehicle speed reduction. Because the automatic transmission control system establishes the reference value of vehicle speed reduction according to vehicle speeds in addition to slope of a downgrade used in the conventional method, a more precise level of transmission gear shift control on downgrades is realized.

The reference value of vehicle speed reduction may be altered to become progressively greater as a vehicle speed increases so that the downshift is executed only when a vehicle speed reduction increases at higher vehicle speeds relatively greater than at lower vehicle speeds. The result is that shift shocks are eliminated at higher vehicle speeds. In this instance, even if a downshift is executed at higher vehicle speeds, because the execution of the downshift is during a period of rapid deceleration, only less unpleasant of shift shocks are experienced by the driver.

Furthermore, the reference value of vehicle speed reduction may be established to be smaller when a downgrade is steep as compared to when it is at a mild slope. In this instance, the reference value of vehicle speed reduction is established to be smaller when the downgrade is steep, the downshift can be executed even when the vehicle speed reduction is relatively smaller when the vehicle is on a steep downgrade than when the vehicle is on a gentle downgrade. This enables the effect of engine braking to be applied earlier when the vehicle is on a steep downgrade. Because both the extent of slope and vehicle speed are simultaneously considered in the alteration of the reference value of vehicle speed reduction, a higher quality of downshift control is realized over a conventional downshift control.

The automatic transmission control system also capable of providing a pronounced engine braking effect on a downgrade by downshifting the automatic transmission to a lower gear when the vehicle speed reduction has exceeded the reference value resulting from application of footbrake, which interrupts the downgrade gear shift control when the vehicle speed exceeds a specified reference vehicle speed. Because the downgrade gear shift control can be canceled or interrupted when the vehicle speed exceeds the reference speed, the automatic transmission is prevented from shifting down while the vehicle is traveling at speeds in excess of the reference speed. Accordingly, by setting the reference speed at a point where shift shocks become more pronounced, the problem of excessive shift shocks can be further alleviated. Moreover, if a downgrade is encountered after the vehicle speed falls below the reference speed, the downgrade gear shift control may be modified to provide appropriate downshift control according to both vehicle speed and downgrade slope.

In this instance, the downshift control interruption is resumed when the vehicle speed falls below the reference speed, and the downgrade gear shift control once again be executed if the vehicle speed reduction exceeds the reference value of speed reduction and if other control factors are satisfied. In such an event, wheels are apt to lock when footbrake is applied with an intention to lower the vehicle speed in cases where friction becomes reduced between the tires and road surface (when road surface has a low frictional coefficient). As a result, due to monitoring a vehicle speed which is lower than the actual vehicle speed on the basis of wheel speeds, the downgrade gear shift control is wrongly executed even though the actual vehicle speed is still greater than the reference speed. This will not only result in increased shift shock, but degrade stability of driving performance as well.

Such a wrong execution of the downgrade gear shift control is prevented by continuously interrupting the control even when the vehicle speed falls below the reference speed in an event where the vehicle speed has been greater than the reference speed at application of footbrake. As a result, because the downgrade gear shift control is interrupted when the vehicle is traveling at a speed in excess of the reference speed at application of footbrake, the control is not resumed even when the vehicle speed has fallen below the reference speed, preventing wrong execution of the downgrade gear shift control due to wheel lock.

The downgrade gear shift control may still continuously interrupted when vehicle speed falls below the reference vehicle speed if it has been between a first reference vehicle speed and a second reference speed greater than the first reference speed at application of footbrake. To explain further, a parameter which is applied to interrupt the downgrade gear shift control is vehicle speed at which application of footbrake causes wheels to lock as much as a large difference is generated between monitored vehicle speed and actual vehicle speed. This critical vehicle speed is established as second reference vehicle speed different from the first reference vehicle speed at which pronounced shift shock can occur as a result of application of footbrake. When the vehicle remains its speed above the second reference vehicle speed at application of footbrake, the downgrade gear shift control is interrupted in order to prevent shift shock which could be induced by wheel lock. If the vehicle speed falls its speed below the second reference vehicle speed, chances of wrong execution of the downgrade gear shift control are reduced because the effect from wheel lock is slight, so that downgrade gear shift control is resumed at a time the vehicle attains the second reference vehicle speed.

The downgrade gear shift control applies a downshift of the transmission to a gear which provides a more strong engine braking effect when the vehicle falls its speed at a rate greater than the reference value of vehicle speed reduction on a downgrade, speed, as monitored by the vehicle speed monitoring means, is high; said engine braking effect being smaller than the value obtained. Because the effect of engine braking provided by a gear achieved in the downgrade gear shift control is lowered more when the vehicle is traveling at higher speeds than when traveling at lower speeds a low vehicle speed, torque fluctuations are reduced during downshifts at higher speeds and the resultant shift shocks are suppressed. This downgrade gear shift control is especially beneficial to a continuous variable type of automatic transmissions.

BRIEF DESCRIPTION OF THE DRAWINGS

The above and other objects and features of the invention will be clearly understood from the following description with respect to preferred embodiments thereof when considered in conjunction with the accompanying drawings, in which.

DETAILED DESCRIPTION OF THE SPECIFIC EMBODIMENTS

Because automatic transmissions and engines and their related mechanisms and elements are well known, the present description will be directed in particular to elements forming part of, or cooperating directly with, the control system in accordance with the invention. It is to be understood that mechanisms and elements not specifically shown or descrobed can take various forms well known to those skilled in the art.

Figure 1:
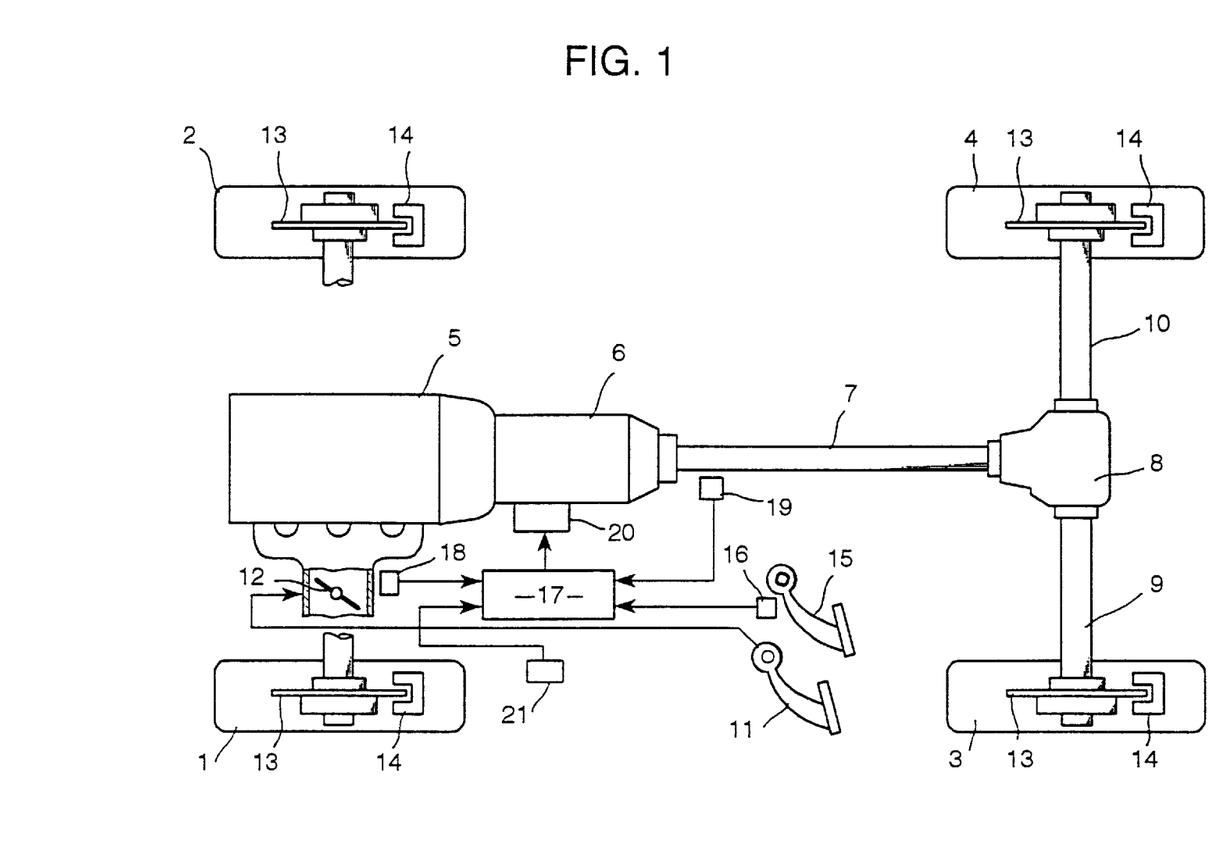
FIG. 1 is a schematic illustration of a vehicle equipped with an automatic transmission control system in accordance with a specific embodiment of the invention.

Referring to the drawings in detail, in particular, to FIG. 1 schematically showing a vehicle to which an automatic transmission control system is installed, the vehicle is equipped with an engine 5 which supplies driving force to left and right rear drive wheels 3 and 4 through drive axles 9 and 10 via a multiple gear automatic transmission 6, a propeller shaft 7 and a differential gear 8. The engine 5 is provided with an intake system equipped with a throttle value 12 which is linked to and operated by a driver-controlled accelerator pedal 11 to be controlled in opening with the result of regulating the amount of intake air supplied to the engine 5 on the basis of which eigne output torque is controlled. A speed sensor 19 is provided adjacent to the automatic transmission 6 to monitor as a vehicle speed a rotational speed of the propeller shaft 7.

Left and right front driven wheels 1 and 2 and left and right rear driving wheels 3 and 4 are each equipped with a brake disk 13 operationally integrated to each wheel and a brake caliper 14, the speed of the brake disk 13 being controlled by the brake caliper 14 according to braking force supplied to the brake caliper 14. Depression of a brake pedal 15 pressurizes the brake calipers 14 in a manner as to control rotational speeds of the wheels 1 through 4. This footbrake sensor 16, which is installed in proximity to the brake pedal 15, monitors a depressed stroke of the brake pedal 15 to output a signal denoting the depressed stroke to a control unit 17 of the automatic transmission 6. A throttle sensor 18 is installed in proximity to the throttle valve 12 to output a signal denoting opening of the throttle valve 12. Denoted by a numeral 21 is a slope sensor for monitoring a slope of a downgrade road on which the vehicle is traveling or an angle of inclination of the vehicle which is substituted for a slope of the downgrade road. All these sensors 16, 18, 19 and 21 are known in varyous types and may take any well known types.

Figure 2:
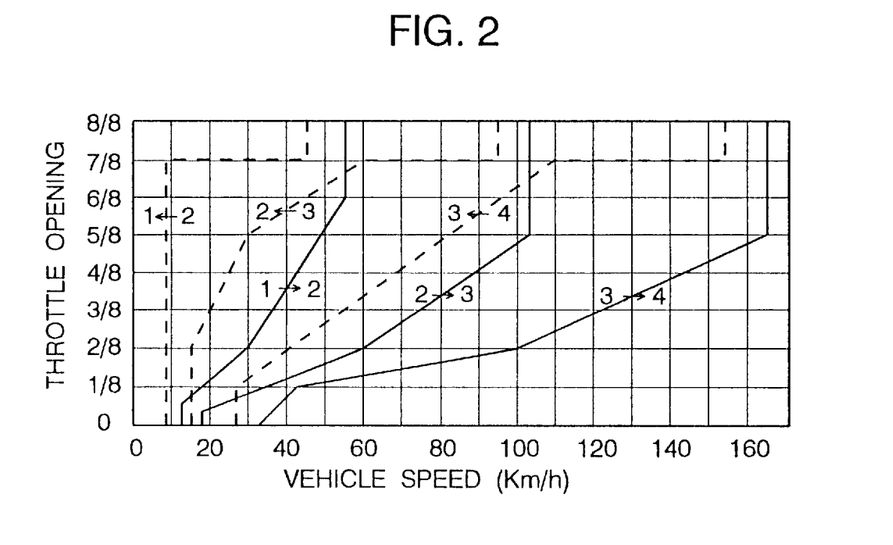
FIG. 2 is a scheduled gear shift map.

Control unit 17, after receiving signals from the throttle sensor 18 and speed sensor 19, respectively, selects an appropriate gear in relation to a driving condition, i.e. the throttle opening and vehicle speed denoted by the signals from a gear shift map. As shown in FIG. 2, this gear shift map, prepared for gear shifts in the drive (D) range by example, specifies prearranged gear shifts according to driving conditions determined on the basis of two parameters, i.e. throttle opening and vehicle speed. The appropriate gear shift is caused by sending a shift signal to a shift control unit 20 of the automatic transmission 6.

D-range gear shift map shown in FIG. 2 specifies gear shift timing causing smooth gear shifts while the vehicle is traveling on flat roads with the automatic transmission 6 put in the drive (D) range and is provided with a hysteresis between each corresponding upshift (solid line) and downshift (broken line). For example, if the throttle opening is at zero (0) such as braking the vehicle, the automatic transmission 6 is prevented from shifting down from fourth gear to third gear until the vehicle speed falls below 27 km/h. In this case, however, if the brake pedal 15 is depressed in order to decelerate when a downgrade is encountered with the vehicle put in fourth gear, it takes a time too much until the downshift to third gear takes place. In order to avoid this uninvited time, the control unit 17 executes the downgrade shift control to cause a downshift to third gear with a result of higher engine brake effect when specified driving conditions are achieved.

Figure 3:
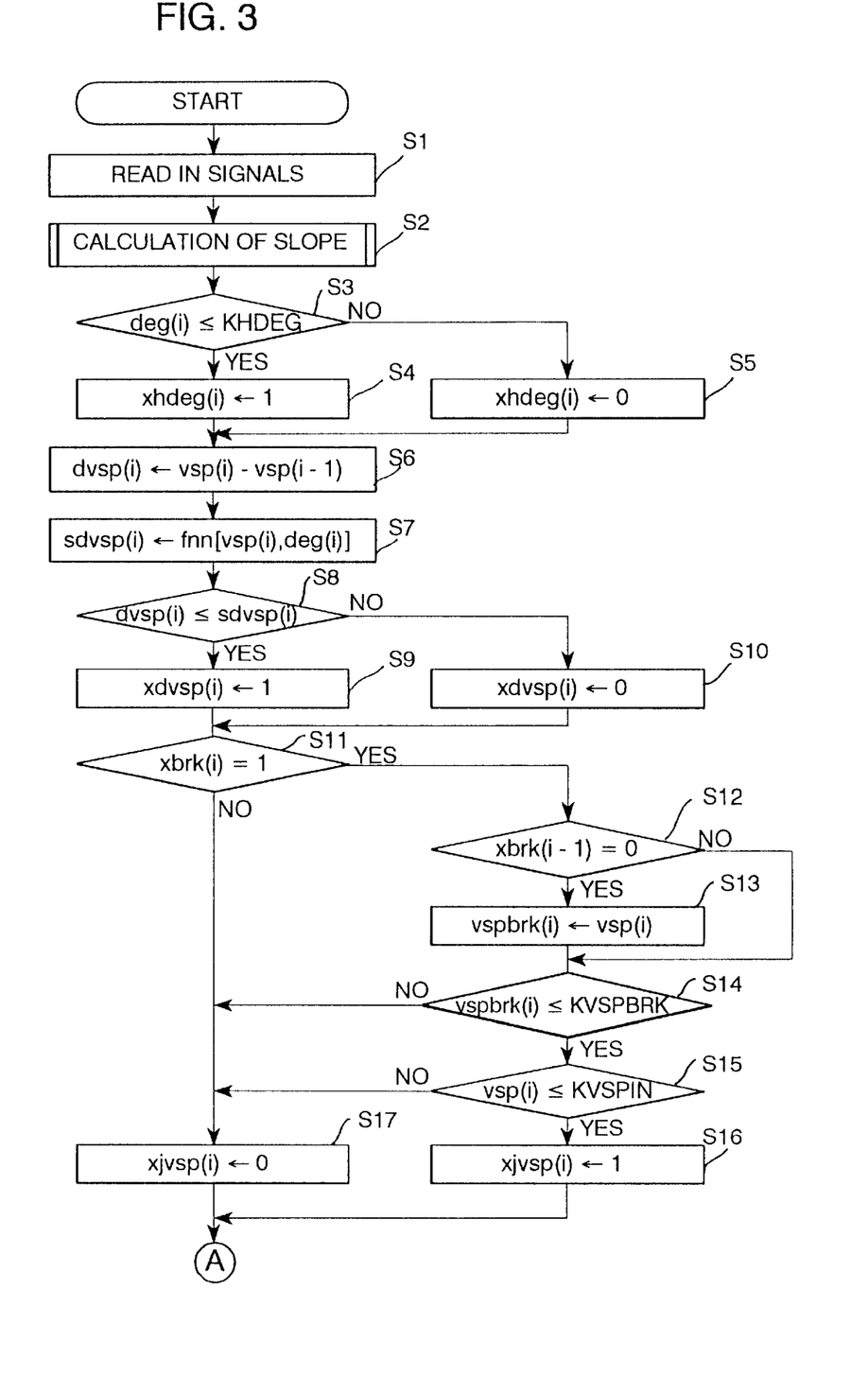
FIG. 3 is a part of a flowchart illustrating the downgrade gear shift control routine.
Figure 4:
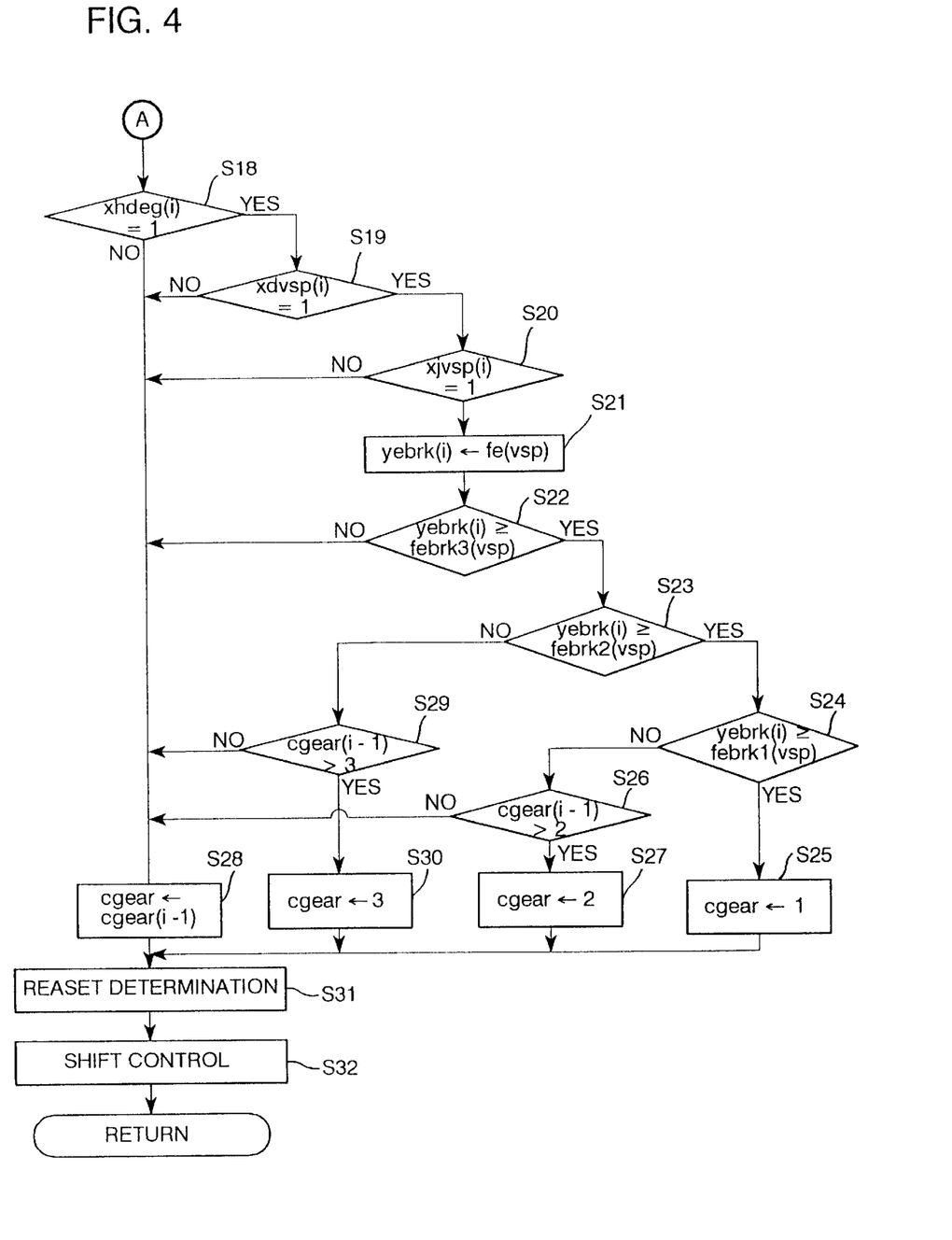
FIG. 4 is another part of the flowchart illustrating the downgrade gear shift control routine.

The following discussion will be directed to the downgrade gear selection in connection with FIGS. 3 and 4 which show a flowchart illustrating the downgrade gear selection sequential routine.

The flowchart logic commences and control passes directly to a function block at step S1 where signals are read in from various sensors 16, 18 and 19. Subsequently, a slope angle calculation subroutine is called for to calculate a slope in degree dig(i) at step S2. This slope is represented by a minus angle for a downgrade and increases with an increase in an absolute value of angle. On the basis of the slope angle calculation, a determination is made at step S3 as to whether the slope angle dig(i) is equal to or less than a specified reference angle KHDEG which denotes a steep downgrade exceeding a specified slope. According to a result of the determination, a downgrade flag xhdeg(i) is up or set to a state of "1" if the slope angle deg(i) is equal to or less than the specified reference angle KHDEG at step S4, or is down or set to a state of "0" if the slope angle deg(i) is greater than the specified reference angle KHDEG at step S5.

Figure 5:
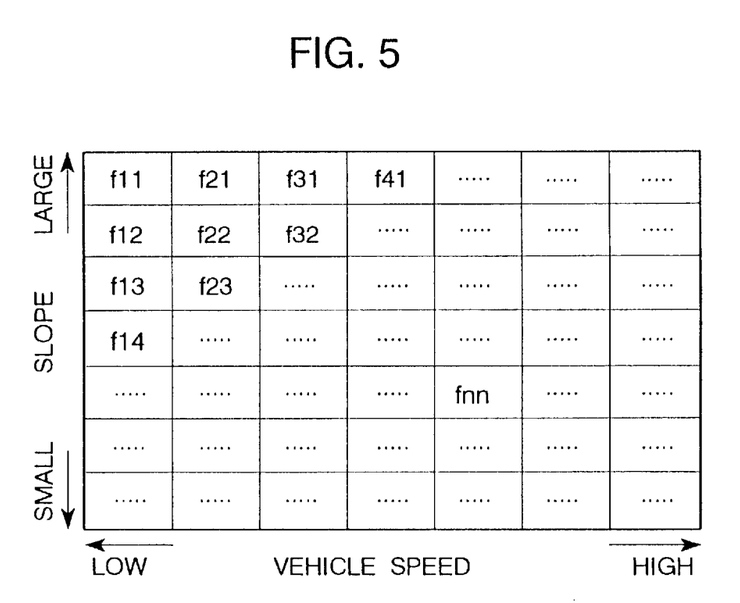
FIG. 5 is a map of reference value of vehicle speed reduction.

Subsequently, a vehicle speed reduction dvsp(i) is calculated by subtracting the last vehicle speed vsp(i-1) from the current vehicle speed vsp(i) at step S6, and a reference speed reduction map such as shown in FIG. 5 is searched to obtain a value fnn as a reference vehicle speed reduction sdvsp i) for the current vehicle speed vsp(i) and vehicle speed reduction dvsp(i) at step S7. The reference speed reduction map specifies minus values fnn resident in specific vehicle speeds vsp(i) versus slope angles deg(i). In this instance, the values fnn in the map are set lower (greater in absolute value) with an increase in vehicle speed or set higher (smaller in absolute value) with a decrease in vehicle speed.

At step S8, a determination is made as to whether the vehicle speed reduction dvsp(i) is equal to or less than the reference vehicle speed reduction sdvsp(i). After having set a deceleration flag xdvsp(i) up to a state of "1" at step S9 if the vehicle speed reduction dvsp(i) is equal to or less than the reference vehicle speed reduction sdvsp i), this indicates that deceleration is rapid more than a specified degree, or down to a state of "0" at step S10 if it is greater than the reference vehicle speed reduction sdvsp(i), a determination is made at step S11 as to whether a brake flag xbrk(i) has been up or set to "1 ". This brake flag xbrk(i-1) signifies that the brake pedal 15 remains depressed, when it is up, or that the brake pedal 15 has been depressed starting with the current cycle of the downgrade gear selection routine when it is down. If the brake flag xbrk(i) has been up, the brake flag xbrk(i-1) in the preceding cycle of the downgrade gear selection routine is referenced at step S12. If the state of brake flag xbrk(i-1) in the preceding cycle is "0," the current vehicle speed vsp(i) is substituted for a current braked vehicle speed vspbrk(i) at step S13. However, if the state of brake flag xbrk(i-1) in the preceding cycle is "1," the current vehicle speed vsp(i) is nothing but a braked vehicle speed vspbrk(i) vehicle speed after application of brake.

Thereafter, a determination is made at step S14 as to whether the braked vehicle speed vspbrk(i) is equal to or less than a specified reference braked vehicle speed KVSPBRK. If the braked vehicle speed vspbrk(i) is equal to or less than the reference braked vehicle speed KVSPBRK, another determination is made at step S15 as to whether the current vehicle speed vsp(i) is equal to or less than a specified reference vehicle speed KVSPIN. If the current vehicle speed vsp(i) is equal to or less than a specified reference vehicle speed KVSPIN, a vehicle speed flag xjvsp(i) is set to a state of "1" at step S16.

The vehicle speed flag xjvsp(i) is set to a state of "0" at step S17 if it is determined at step S11 that the brake flag xbrk(i) has been down, if it is determined at step S14 that the braked vehicle speed vspbrk(i) has exceeded the reference braked vehicle speed KVSPBRK, or if it is determined at step S15 that the current vehicle speed vsp(i) has exceeded the reference vehicle speed KVSPIN.

The reference speed KVSPIN utilized in the determination concerning vehicle speed at step S15 is experimentally established as a threshold vehicle speed over which the vehicle would encounter unacceptably high shift shocks during downshifts and is set, for example, at 70 km/h. The reference speed KVSPBRK utilized in the determination concerning braked vehicle speed at step S14 is experimentally established as a threshold vehicle speed over which wheel lock occurs when footbrake is applied and, as a result, the vehicle speed is monitored in error to be less than 70 Km/h even when the actual vehicle speed exceeds 70 Km/h. For example, the reference speed KVSPBRK is set at 120 km/h. The result is that there will be no great error in monitored vehicle speed when actual vehicle speed exceeds 70 km/h. These reference speeds KVSPBRK and VKSPIN are established for their own specific and individual purposes and, while they will exist as differing speeds in ordinary applications, they may also take the same speed as a result of vehicle construction and/or other factors.

Figure 6:
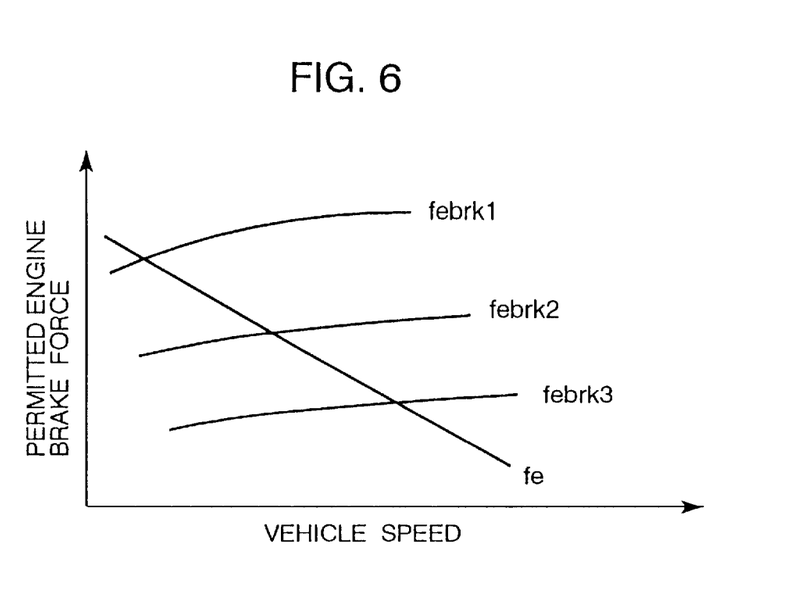
FIG. 6 is a map of engine braking force used in the downgrade gear shift control.

At steps S18 through S20, determinations are made as to whether the flags xhdeg(i), xdvsp(i) and xjvsp(i) have been set to their states of "1 ", respectively. If all of these flags xhdeg(i), xdvsp(i) and xjvsp(i) are monitored as being in the state of "1," an engine braking force map such as shown in FIG. 6 is searched to obtain a value fe as an allowable engine braking force yebrk(i) for the current vehicle speed vsp(i) at step S21. In a similar manner, the engine braking force map is searched to obtain engine braking force febrk1(vsp), febrk2(vsp) and febrk3(vsp) in relation to the current vehicle speed vsp(i) for first, second and third gears, respectively. As apparent from FIG. 6, the engine braking map specifies the allowable engine braking force decreasing with an increase in vehicle speed vsp.

These engine braking force febrk1(vsp), febrk2(vsp) and febrk3(vsp) are compared to the allowable engine braking force yebrk(i) at steps S22 through S24, respectively, to determine a current prearranged gear cgear(i) to which the automatic transmission 6 is to be currently shifted. Specifically, if the allowable engine braking force yebrk(i) is equal to or greater than the engine braking force febrk1(vsp) for first gear (1st), first gear (1st) is selected as the current prearranged gear cgear(i) at step S25. On the other hand, if the allowable engine braking force yebrk(i) is smaller than the first gear engine braking force febrk1(vsp) but equal to or greater than the second gear engine braking force febrk2 (vsp), the sequential routine advances to a function at step S26 where a determination is made as to whether the previous prearranged gear cgear(i-1) in the preceding cycle was higher than second gear (2nd). If the previous prearranged gear cgear(i-1) was third gear (3rd) or fourth gear (4th), second gear (2nd) is selected as the current prearranged gear cgear(i) at step S27. However, if the previous prearranged gear cgear(i-1) was a gear lower than third gear (3rd), i.e. second gear (2nd) or first gear (1st), the previous prearranged gear cgear(i-1) is selected as the current prearranged gear cgear(i) at step S28. If the allowable engine braking force yebrk(i) is smaller than the second gear engine braking force febrk2(vsp) but equal to or greater than the third gear engine braking force febrk3(vsp), the sequential routine advances to a function at step S29 where a determination is made as to whether the previous prearranged gear cgear(i-1) in the preceding cycle was higher than third gear (3rd). If the previous prearranged gear cgear(i-1) was fourth gear (4th), third gear (3rd) is selected as the current prearranged gear cgear(i) at step S30. However, if the previous prearranged gear cgear(i-1) was a gear lower than fourth gear (4th), i.e. third gear (3rd), second gear (2nd) or first gear (1st), the previous prearranged gear cgear(i-1) is selected as the current prearranged gear cgear(i) at step S28.

Further, if the allowable engine braking force yebrk(i) is smaller than the third gear engine braking force febrk3(vsp), the sequential routine advances to the function at step S28 to select directly the previous prearranged gear cgear(i-1) as the current prearranged gear cgear(i) at step S28. Furthermore, if any one of the flags xhdeg(i), xdvsp(i) and xjvsp(i) up or set to their states of "1" at steps 18 through 20, respectively, the current prearranged gear cgear(i) is maintained the same as the previous prearranged gear it was in the previous cycle at step S28.

After having called for and executed a control reset subroutine to determine as to whether the downgrade gear selection routine at step S31, a downgrade gearshift control subroutine is called for at step S32 in order to output a shift signal for causing a downshift of the automatic transmission 6 into the prearranged gear cgear(i) to the shift control unit 20.

Through the downgrade gear selection routine, the vehicle is put into a lower gear which provides a pronounced engine braking effect during traveling on a downgrade at a slope greater than the specified reference angle when, as a result of applying footbrake, the vehicle speed reduction rate exceeds a specified level. The vehicle speed reduction (the reference vehicle speed reduction sdvsp(i)) is varied according to slope angles such that the vehicle is put into a lower gear even when the vehicle changes its speed at a low speed reduction rate, providing quickly a pronounced engine braking effect during traveling on a downgrade. In this instance, the lower the speed reduction rate may be, the steeper the downgrade is. The vehicle speed reduction (the reference vehicle speed reduction sdvsp(i)) is also varied according to vehicle speeds such that a downshift of the automatic transmission 6 is prevented when there is a smaller vehicle speed reduction at a higher vehicle speed. Altering the reference vehicle speed reduction sdvsp(i) in this manner provides a more precise downgrade downshift of the automatic transmission 6 which better meets the driver's feeling when the vehicle is traveling on a downgrade. Together, altering the reference vehicle speed reduction sdvsp(i) suppress the automatic transmission 6 to cause a downshift at high vehicle speeds, preventing an occurrence of excessive shift shock, and allows the automatic transmission 6 to cause a downshift only during high deceleration, reducing unpleasant feeling of shift shock.

The vehicle speed flag xjvsp(i) is down or set to the state of "0" to prevent the automatic transmission 6 from causing a downshift when the braked vehicle speed vspbrk(i) exceeds the reference braked vehicle speed KVSPBRK as a result of applying footbrake and when the vehicle speed vsp(i) exceeds the reference vehicle speed KVSPIN, wrong-control of the downgrade gear shift, which is a harmful effect resulting from wheel lock, is prevented and shift shock is certainly prevented when the vehicle is traveling at high vehicle speeds. In other words, in the specific embodiment, while the vehicle is traveling at a speed less than 120 Km/h, for example at a speed of from 80 to 90 Km/h which is free from a risk of wheels being locked, the selection of a gear is made only when footbrake is applied and, as a result, the vehicle speed has fallen to less than a speed of 70 Km/h at which the driver has less unpleasant shift shock. Resultingly, wrong-control of a downgrade gear shift and shift shock are prevented and the downgrade gear shift control is executed more appropriately to enable the vehicle to travel suitably on a downgrade.

Figure 7:
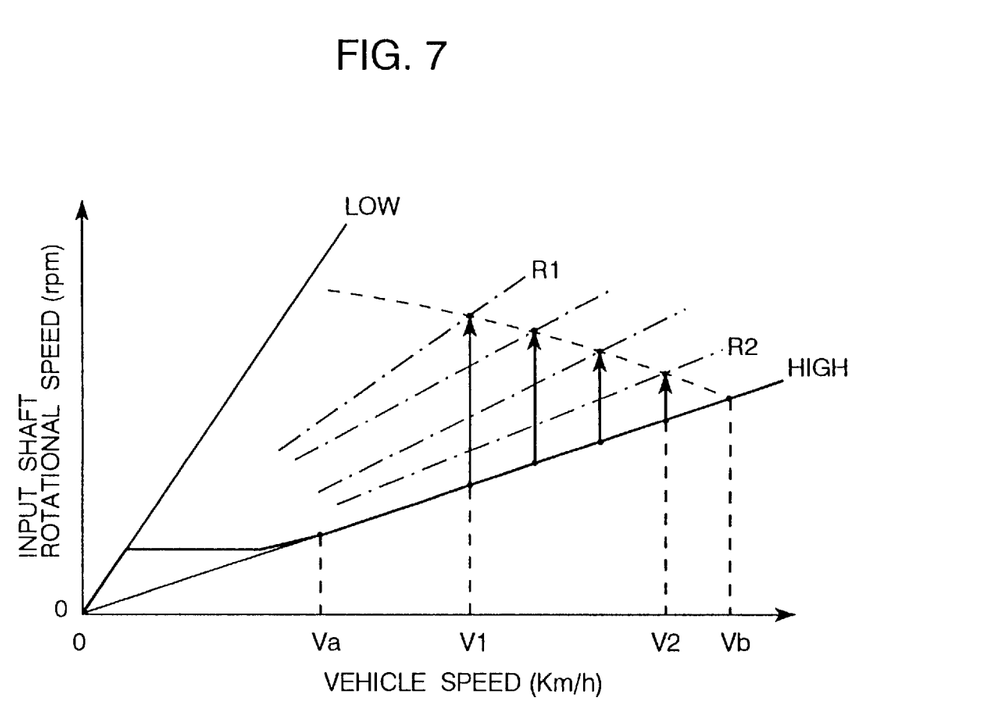
FIG. 7 is a downgrade gear shift map for throttle opening of % used in the downgrade gear shift control for a continuous variable automatic transmission.

The downgrade gear shift control may be applied to a continuously variable automatic transmission which is able to continuously alter the reduction ratio in relation to rotational speed of an input shaft (which is hereafter referred to an input shaft speed) of the automatic transmission connected to a torque converter and vehicle speed or a rotational speed of a propeller shaft between the largest reduction ratio at which the strongest engine braking effect is provided as shown by line labeled "Low" and the smallest reduction ratio at which the smallest engine braking effect is provided as shown by line "High ", as shown in FIG. 7. Specifically, the reduction ratio is continuously variable between the "Low" line and the "High" line for various throttle opening so as to provide appropriate reduction ratios, in other words large engine braking effects, according to vehicle speeds. The solid line shows a normal gear shift line provided for the throttle opening of % for the continuously variable automatic transmission when the vehicle is traveling under normal driving conditions. With this normal gear shift line, when the vehicle speed falls below a specific speed Va, the reduction ratio alters from the smallest reduction ratio and attains the largest reduction ratio to attain an engine braking effect gradually increasing with a decrease in the vehicle speed.

Figure 8:
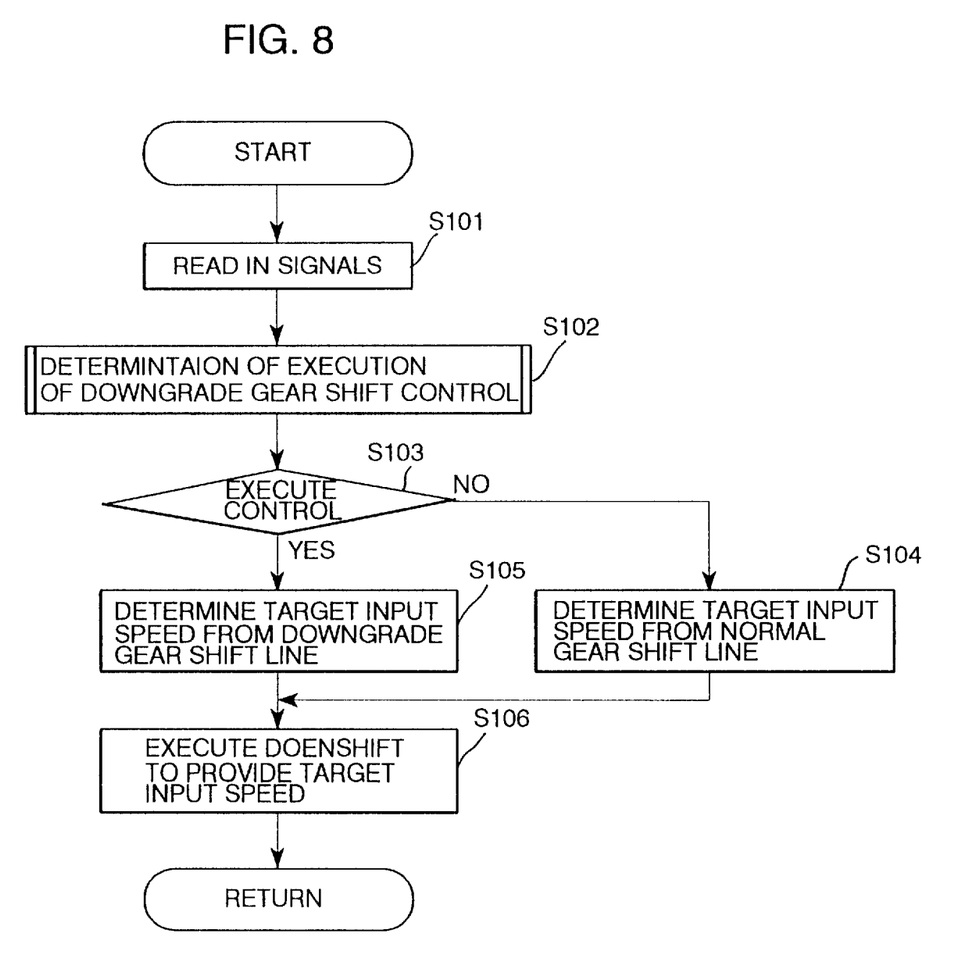
FIG. 8 is a flowchart illustrating the downgrade gear shift control routine for the continuous variable automatic transmission.

A downgrade gear shift lines is provided between the "Low" line and the "High" line as shown by broken lines in FIG. 7. This downgrade gear shift line is established such that the reduction ratio starts to alter at a vehicle speed Vb higher than the specific speed Va and gradually increases as the vehicle speed is lowered. Referring to FIG. 8, which is a flowchart illustrating the downgrade gear shift control with the continuously variable automatic transmission, the flowchart logic commences and control passes directly to a function block at step S101 where signals are read in from various sensors 16, 18 and 19. Subsequently, at step S102, a downgrade gear shift control determination subroutine is called for to prepare necessary data on vehicle driving conditions to make a determination at step S102 as to whether the downgrade gear shift control must be executed. If the vehicle is traveling under conditions which do not require the downgrade gear shift control, the normal gear shift line is applied to determine a target input shaft speed necessary to provide a specific reduction ratio in conformity with the vehicle speed at step S104. On the other hand, if the vehicle is traveling under conditions which require the downgrade gear shift control, the downgrade gear shift line is applied to determine a target input shaft speed necessary to provide a specific reduction ratio in conformity with the vehicle speed at step S105. Thereafter, a shift signal is provided to cause a gear shift necessary to develop the target input shaft speed determined at step 104 or step S105.

As was described previously, because the downgrade gear shift lines is established such that the reduction ratio starts to alter at a vehicle speed Vb higher than the specific speed Va and gradually increases as the vehicle speed is lowered, the reduction ratio is increased with the purpose of increasing the engine braking effect during execution of the downgrade gear shift control. In this instance, because a higher reduction ratio R1 is established for low vehicle speed V1 and a lower reduction ratio R2 is established for high vehicle speed V2, the engine braking effect is decreased as the vehicle speed increases during execution of the downgrade gear shift control and, as a result, shift shocks resulting from downshifts to higher reduction ratios are significantly reduced or eliminated.

The gradient and configuration of the downgrade gear shift control line is not limited to that shown in the figure, but may be freely determined as other considerations dictate.

With the automatic transmission control system of the invention which is structured in a manner as to execute a downgrade gear shift control in consideration of vehicle speed as a control parameter and to alter, in particular, the reference vehicle speed reduction rate value according to vehicle speed in order to determine the necessity to execute the downgrade gear shift control, downshifts during traveling on a downgrade is more precise, and shift shocks resulting from the downshifts at high vehicle speeds are significantly reduced or eliminated and meets better driver's expectations consequently. This precise and shock-free downgrade gear shift control is superior to conventional automatic transmission control systems which refer to a slope angle only as a parameter of controlling downshifts. Furthermore, because the automatic transmission control system of the invention is capable of interrupting the downgrade gear shift control at vehicle speeds over a specific speed at which shift shocks become significant, shifting shocks are significantly reduced while the vehicle is traveling at vehicle speeds over the specific speed and, as a result, not felt by the driver of the vehicle. Moreover, because the automatic transmission control system of the invention is capable of reducing the effect of engine braking in a gear to be provided at higher vehicle speeds, shift shocks generated at high vehicle speeds are significantly reduced.

In addition, because the vehicle speed becomes an important parameter of the downgrade gear shift control, the automatic transmission control system prevents wrong detections of vehicle speed resulting from wheel lock caused due to applications of the footbrake, which are accompanied by faulty downgrade gear shift control. Accordingly, the automatic transmission control system executes or interrupts the downgrade gear shifts on the basis of vehicle speeds at which the wheels are locked resulting from applications of foot brake, enabling the automatic transmission to cause appropriate downgrade gear shifts intended for downgrade driving, while preventing the driver from experiencing shift shocks and promoting stable driving of the vehicle.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A control system for an automatic transmission of an automotive vehicle, said control system comprises:

slope monitoring means for monitoring a slope of a road on which the vehicle is traveling;

speed monitoring means for monitoring a running speed of the vehicle;

a brake sensor for detecting application of a footbrake;

gear shift control means for calculating a deceleration of the vehicle based on said running speed monitored by said speed monitoring means, and causing a downshift of the automatic transmission to a gear which provides an effect of engine braking greater than an effect of engine braking provided before said downshift when said slope monitoring means monitors a slope of a downgrade, said brake sensor detects application of said footbrake and said deceleration exceeds a specified deceleration.

2. The control system for an automatic transmission as defined in claim 1, wherein said gear shift control means prohibits said downshift of the automatic transmission when said speed monitoring means monitors a running speed of the vehicle greater than a specified first speed in spite of said slope and said deceleration.

3. The control system for an automatic transmission as defined in claim 2, wherein said gear shift control means continuously prohibits said downshift of the automatic transmission, when said speed monitoring means has monitored a running speed of the vehicle greater than a specified second speed of the vehicle at a beginning of application of said footbrake, even if said speed monitoring means monitors a running speed below said specified first speed during said footbrake application.

4. The control system for an automatic transmission as defined in claim 2, wherein said gear shift control means continuously prohibits said downshift of the automatic transmission, when said speed monitoring means monitors a running speed of the vehicle greater than a specified second speed lower than said specified first speed at a beginning of application of said footbrake, even if said speed monitoring means monitors a running speed falling below said specified first speed during said footbrake application and removes said prohibition of said downshift of the automatic transmission when said speed monitoring means monitors a running speed of the vehicle below said specified second speed.

5. The control system for an automatic transmission as defined in claim 1, wherein said gear shift control means alters said specified deceleration greater with an increase in said running speed of the vehicle.

6. The control system for an automatic transmission as defined in claim 1, wherein said gear shift control means alters said specified deceleration smaller with an increase in said slope of a downgrade.

7. The control system for an automatic transmission as defined in claim 5, wherein said gear shift control means prohibits said downshift of the automatic transmission when said speed monitoring means monitors a running speed of the vehicle greater than a specified first speed in spite of said slope and said deceleration.

8. The control system for an automatic transmission as defined in claim 7, wherein said gear shift control means continuously prohibits said downshift of the automatic transmission, when said speed monitoring means has monitored a running speed of the vehicle greater than said specified second speed of the vehicle at a beginning of application of a footbrake, even if said speed monitoring means monitors a running speed below said specified first speed during said footbrake application.

9. The control system for an automatic transmission as defined in claim 7, wherein said gear shift control means continuously prohibits said downshift of the automatic transmission, when said speed monitoring means monitors a running speed of the vehicle greater than a specified second speed lower than said specified first speed at a beginning of application of said footbrake, even if said speed monitoring means monitors a running speed falling below said specified first speed during said footbrake application and removes said prohibition of said downshift of the automatic transmission when said speed monitoring means monitors a running speed of the vehicle below said specified second speed.

10. The control system for an automatic transmission as defined in claim 1, wherein said gear provides an effect of engine brake smaller when said running speed is high as compared with when said running speed is low.

11. A control system for an automatic transmission of an automotive vehicle, said control system comprises:

slope monitoring means for monitoring a slope of a road on which the vehicle is traveling;

speed monitoring means for monitoring a running speed of the vehicle;

gear shift control means for calculating a deceleration of the vehicle based on said running speed monitored by said speed monitoring means, and causing a downshift of the automatic transmission to a gear which provides an effect of engine braking greater than an effect of engine braking provided before said downshift when said slope monitoring means monitors a downgrade slope and said deceleration exceeds a specified deceleration, said gear providing an effect of engine brake smaller when said running speed is high as compared with when said running speed is low.

12. The control system for an automatic transmission as defined in claim 11, wherein said gear shift control means alters said specified deceleration greater with an increase in said running speed of the vehicle.

13. The control system for an automatic transmission as defined in claim 11, and further comprising a brake sensor for monitoring application of a footbrake, wherein said gear shift control means causes said downshift only while said brake sensor monitors application of said footbrake.

14. The control system for an automatic transmission as defined in claim 11, wherein said automatic transmission is of a continuously variable type.

15. The control system for an automatic transmission as defined in claim 1, wherein said speed monitor means monitors a rotational speed of an output shaft of the automatic transmission.

16. A control system for an automatic transmission of an automotive vehicle, said control system comprises:

slope monitoring means for monitoring a slope of a road on which the vehicle is traveling;

speed monitoring means for monitoring a running speed of the vehicle;

a brake sensor for detecting application of a footbrake;

gear shift control means for calculating a deceleration of the vehicle based on said running speed monitored by said speed monitoring means, causing a downshift of the automatic transmission to a gear which provides an effect of engine braking greater than an effect of engine braking provided before said downshift when said slope monitoring means monitors a slope of a downgrade, said brake sensor detects application of said footbrake and said deceleration exceeds a specified deceleration, and prohibiting said downshift of the automatic transmission when said speed monitoring means monitors a running speed of the vehicle greater than a specified first speed in spite of said slope and said deceleration.

17. A control system for an automatic transmission of an automotive vehicle, said control system comprises:

slope monitoring means for monitoring a slope of a road on which the vehicle is traveling;

speed monitoring means for monitoring a running speed of the vehicle;

a brake sensor for detecting application of a footbrake;

gear shift control means for calculating a deceleration of the vehicle based on said running speed monitored by said speed monitoring means, causing a downshift of the automatic transmission to a gear which provides an effect of engine braking greater than an effect of engine braking provided before said downshift when said slope monitoring means monitors a slope of a downgrade, said brake sensor detects application of said footbrake and said deceleration exceeds a specified deceleration, prohibiting said downshift of the automatic transmission when said speed monitoring means monitors a running speed of the vehicle greater than a specified first speed in spite of said slope and said deceleration, continuing said prohibition of said downshift of the automatic transmission, when said speed monitoring means monitors a running speed of the vehicle greater than a specified second speed lower than said specified first speed at a beginning of application of said footbrake, even if said speed monitoring means monitors a running speed falling below said specified first speed during said footbrake application and removing said prohibition of said downshift of the automatic transmission when said speed monitoring means monitors a running speed of the vehicle below said specified second speed.

18. A control system for an automatic transmission of an automotive vehicle, said control system comprises:

slope monitoring means for monitoring a slope of a road on which the vehicle is traveling;

speed monitoring means for monitoring a running speed of the vehicle;

a brake sensor of detecting application of a footbrake;

gear shift control means for calculating a deceleration of the vehicle based on said running speed monitored by said speed monitoring means, causing a downshift of the automatic transmission to a gear which provides an effect of engine braking greater than an effect of engine braking provided before said downshift when said slope monitoring means monitors a slope of a downgrade, said brake sensor detects application of said footbrake and said deceleration exceeds a specified deceleration, and altering said specified deceleration greater with an increase in said running speed of the vehicle.

19. A control system for an automatic transmission of an automotive vehicle, said control system comprises:

slope monitoring means for monitoring a slope of a road on which the vehicle is traveling;

speed monitoring means for monitoring a running speed of the vehicle;

gear shift control means for calculating a deceleration of the vehicle based on said running speed monitored by said speed monitoring means, causing a downshift of the automatic transmission to a gear which provides an effect of engine braking greater than an effect of engine braking provided before said downshift when said slope monitoring means monitors a downgrade slope and said deceleration exceeds a specified deceleration, said gear providing an effect of engine brake smaller when said running speed is high as compared with when said running speed is low, and altering said specified deceleration greater with an increase in said running speed of the vehicle.

20. A control system for an automatic continuously variable transmission of an automotive vehicle, said control system comprises:

slope monitoring means for monitoring a slope of a road on which the vehicle is traveling;

speed monitoring means for monitoring a running speed of the vehicle;

gear shift control means for calculating a deceleration of the vehicle based on said running speed monitored by said speed monitoring means, causing a downshift of the automatic transmission to a gear which provides an effect of engine braking greater than an effect of engine braking provided before said downshift when said slope monitoring means monitors a downgrade slope and said deceleration exceeds a specified deceleration, said gear providing an effect of engine brake smaller when said running speed is high as compared with when said running speed is low, and altering said specified deceleration greater with an increase in said running speed of the vehicle.

21. A control system for an automatic transmission for varying a gear ratio between an engine and drive wheels of an automotive vehicle, said control system comprising:

a throttle sensor for detecting opening of an engine throttle;

a speed sensor for detecting a running speed of the vehicle;

a brake sensor for detecting application of a footbrake of the vehicle; and a control unit for controlling the automatic transmission based on incoming signals for said speed sensor, said brake sensor and said throttle sensor;

said control unit performs calculations of a deceleration of the vehicle based on said running speed detected by said speed sensor and a slope of a road on which the vehicle is traveling, and causing said automatic transmission to provide a gear ratio which provides an enhanced effect of engine braking when said slope is a downgrade, said brake sensor detects application of said footbrake.

22. A control system for an automatic transmission of an automotive vehicle, said control system comprises:

a slope sensor for detecting a slope of a road on which the vehicle is traveling;

a speed sensor for detecting a running speed of the vehicle;

a brake sensor for detecting application of a footbrake;

a control unit for calculating a deceleration of the vehicle based on said running speed detected by said speed sensor, causing a downshift of the automatic transmission to a gear which provides an effect of engine braking greater than an effect of engine braking provided before said downshift when said slope sensor detects a slope of a downgrade, said brake sensor detects application of said footbrake and said deceleration exceeds a specified deceleration, and prohibiting said downshift of the automatic transmission when said speed sensor detects a running speed of the vehicle greater than a specified first speed in spite of said slope and said deceleration.

23. A control system for an automatic transmission of an automotive vehicle, said control system comprises:

a slope sensor for detecting a slope of a road on which the vehicle is traveling;

a speed sensor for detecting a running speed of the vehicle;

a brake sensor for detecting application of a footbrake;

a control means for calculating a deceleration of the vehicle based on said running speed detected by said speed sensor, causing a downshift of the automatic transmission to a gear which provides and effect of engine braking greater than an effect of engine braking provided before said downshift when said slope sensor detects a slope of a downgrade, said brake sensor detects application of said footbrake and said deceleration exceeds a specified deceleration, prohibiting said downshift of the automatic transmission when said speed sensor detects a running speed of the vehicle greater than a specified first speed in spite of said slope and said deceleration, continuing said prohibition of said downshift of the automatic transmission, when said speed sensor detects a running speed of the vehicle greater than a specified second speed lower than said specified first speed at a beginning of application of said footbrake, even if said speed sensor detects a running speed falling below said specified first speed during said footbrake application and removing said prohibition of said downshift of the automatic transmission when said speed sensor detects a running speed of the vehicle below said specified second speed.

24. A control system for an automatic transmission of an automotive vehicle, said control system comprises:

a slope sensor for detecting a slope of a road on which the vehicle is traveling;

a speed sensor for detecting a running speed of the vehicle;

a brake sensor for detecting application of a footbrake;

a control unit for calculating a deceleration of the vehicle based on said running speed detected by said speed sensor, causing a downshift of the automatic transmission to a gear which provides an effect on engine braking greater than an effect of engine braking provided before said downshift when said slope sensor detects a slope of a downgrade, said brake sensor detects application of said footbrake and said deceleration exceeds a specified deceleration, and altering said specified deceleration greater with an increase in said running speed of the vehicle.

25. A control system for an automatic transmission of an automotive vehicle, said control system comprises:

a slope sensor for detecting a slope of a road on which the vehicle is traveling;

a speed sensor for detecting a running speed of the vehicle; and a control unit for calculating a deceleration of the vehicle based on said running speed detected by said speed sensor, causing a downshift of the automatic transmission to a gear which provides an effect of engine braking greater than an effect of engine braking provided before said downshift when said slope sensor detects a downgrade slope and said deceleration exceeds a specified deceleration, said gear providing an effect of engine brake smaller when said running speed is high as compared with when said running speed is low, and altering said specified deceleration greater with an increase in said running speed of the vehicle.

26. A control system for an automatic continuously variable transmission of an automotive vehicle, said control system comprises:

a slope sensor for detecting a slope of a road on which the vehicle is traveling;

a speed sensor for detecting a running speed of the vehicle;

a control unit for calculating a deceleration of the vehicle based on said running speed detected by said speed sensor, causing a downshift of the automatic transmission to a gear which provides an effect of engine braking greater than an effect of engine braking provided before said downshift when said slope sensor detects a downgrade slope and said deceleration exceeds a specified deceleration, said gear providing an effect of engine brake smaller when said running speed is high as compared with when said running speed is low, and altering said specified deceleration greater with an increase in said running speed of the vehicle.

* * * * *